Nov. 11, 1952  G. BLAIR  2,617,915
AIR IMPELLING AND HEATING APPARATUS
Filed April 10, 1951  4 Sheets-Sheet 1
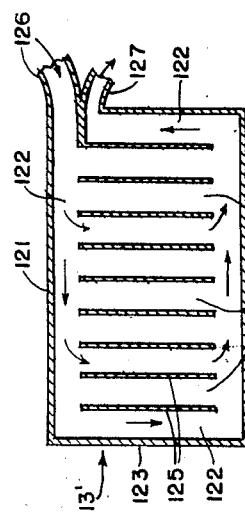
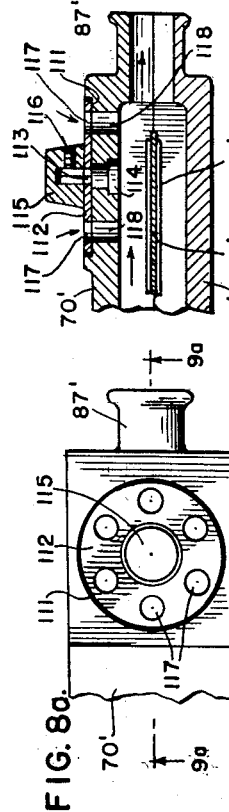
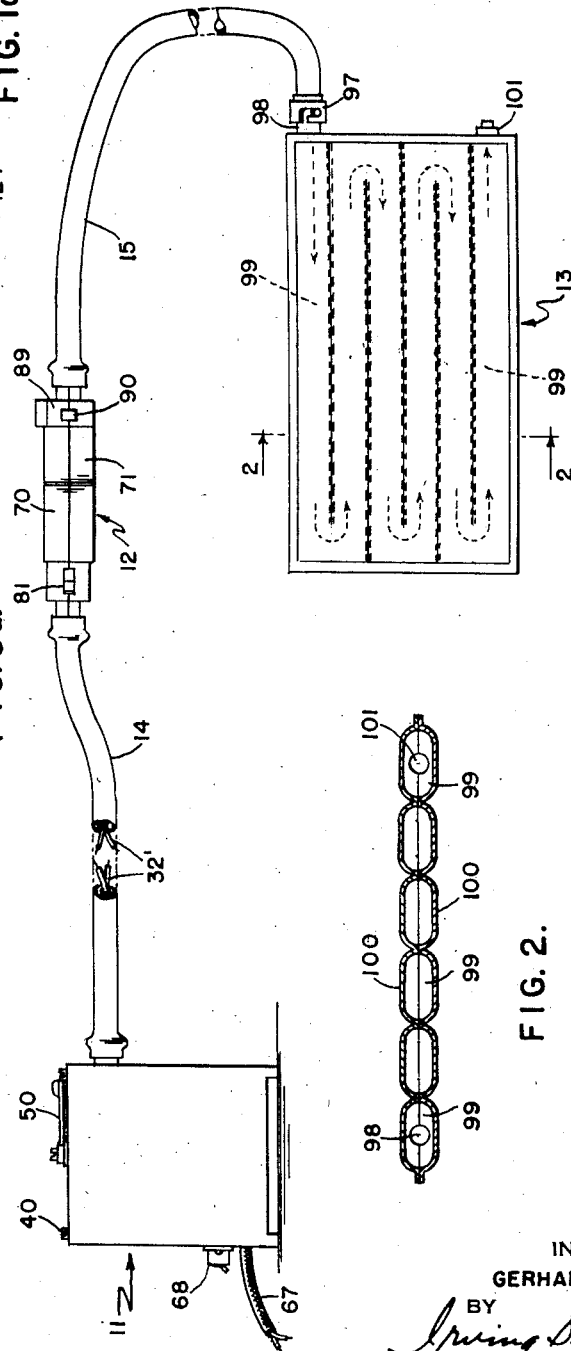
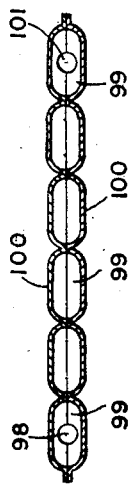
INVENTOR
GERHARDT BLAIR,
BY
Irving Seidman
ATTORNEY Nov. 11, 1952 — G. BLAIR — 2,617,915
AIR IMPELLING AND HEATING APPARATUS
Filed April 10, 1951 — 4 Sheets-Sheet 3

INVENTOR
GERHARDT BLAIR,
BY Irving Seidman
ATTORNEY

Nov. 11, 1952 — G. BLAIR — 2,617,915
AIR IMPELLING AND HEATING APPARATUS
Filed April 10, 1951 — 4 Sheets-Sheet 4

INVENTOR
GERHARDT BLAIR,
BY
Irving Seidman
ATTORNEY

Patented Nov. 11, 1952

2,617,915

UNITED STATES PATENT OFFICE 2,617,915

AIR IMPELLING AND HEATING APPARATUS

Gerhardt Blair, New York, N. Y.

Application April 10, 1951, Serial No. 220,321

7 Claims. (Cl. 219—39)

This invention relates to an air heater and impeller unit and has particular reference to an apparatus of the character described comprising an air impeller, an air heater and an air compartment having an air inlet and an air outlet, and all having flexible tubular connections therebetween.

One object of this invention is to provide an air impeller in combination with a more or less air tight cover or air receptacle, such cover having an enlarged inlet and reduced or closed outlet, to provide a continuous, constant flow of warm or cool air through said cover of plastic or other air resisting material and so designed and heat sealed as to let the air pass from one end to the other through a series of tortuous channels to cover the entire surface of the cover but to prevent the same from uneven or undue inflation at the center.

Another object of this invention is to provide such an air cover whereby the air flow does not extend over the entire surface of the cover, leaving some spaces open to permit evaporation from underneath said cover and prevent eventual condensation.

A further object of this invention is the provision of an air holding cover that can be easily and quickly attached or detached to or from a sheet or blanket by means of a holding pocket or otherwise by snaps or buttons, etc. and exchanged from one to the other, thus permitting such sheets or blankets to be washed separately.

A still further object of this invention is to provide an air cover whereby the air tight plastic or other air resisting material is not heat sealed but sewn in between two sheets of other material without heat sealing in such manner as to create channels through which the air can flow quickly from one end to the other to obtain an air foam like, light weight entity and reduction of weight of such other textiles that might be used in the combination.

A further object of this invention is to provide a cover that will, in combination with a blanket or sheet, by virtue of its own lightweight and air inflation be less than the weight of a blanket or sheet having inside wiring and otherwise or other electrical heating elements.

Another object of this invention is the combination of a cover and air impeller, whereby the intake of the ambient air of the air impeller is thermostatically so calibrated, in relation to the force of air flow and wattage input of the heating element as to maintain a constant and uniform heat inside said cover, regardless of changing temperatures of the ambient heat, provided such ambient temperature does not fall below 40° or go above 85°.

A further object of the invention is the provision of a manual heat control within easy reach at the inlet to the cover regardless of the calibrated intake. Said manual control consisting of a slide in a slot at the outlet allowing some of the ambient air to mix with the heated air in such proportion to cover such ranges desirable for human comfort.

A further object of this invention is the provision therein of means whereby a unit may be able, within easy reach, to cut-off the heating element independently of the air impeller so as to allow only ambient heat or cool air to circulate through the cover.

A further object of this invention is the provision therein of a heating element which may be enclosed in the casing of the air impeller or at a distance from it in a separate casing at the outlet where the manual control is such as to prevent any ambient air to influence the heat or cause any heat lag or change in air temperature while flowing through the tubular connection between the air impeller and the outlet.

A further object of this invention is to provide a device of the character set forth wherein a constant flow of warm air is impelled through the air chamber and wherein all potential fire hazards from electrical wires are eliminated.

Another object of this invention is the inclusion therein of a heater unit disposed in connecting tubes between the air impeller unit and the air chamber to heat the impelled air as it passes through the tubes to the air chamber.

A still further object of this invention includes the method employed for assembling the parts and holding same in place by the attachment of a single element to the housing.

It has been found that an increase in the force of air flow would result in an increase of heat in the cover and vice versa. For this reason the automatic adjustment at the intake was so calibrated to open the orifices to increase the force of air flow when the ambient heat got cooler and close the orifices accordingly as the ambient air got warmer to reduce the force of the flow. Aside from this the thermostatic movement is so calibrated in relation to the orifices respectively (force of air flow) and the relating wattage input of the heating element to cover such ambient temperatures that come into play, that is from —40° to +85° F. and still not go over the maximum allowable heat for human comfort. Any heat adjustment from there on down is obtained by the manual adjustment within easy reach to allow the cool ambient air to mix with the heated air by the slot provided near the outlet.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 1 is a perspective view of an assembly which shows all parts with their tubular connections.

Fig. 1a is a diagrammatic sectional view through an air receptacle and shows a modified form.

Fig. 2 is a transverse section through one form of air chamber and is shown in enlarged scale and is taken along line 2—2 of Fig. 1.

Fig. 8a is a fragmentary plan view of one end of the heater unit and shows a modified form.

Fig. 9a is a sectional elevational view of Fig. 8a and is taken along line 9a—9a.

Figure 3:
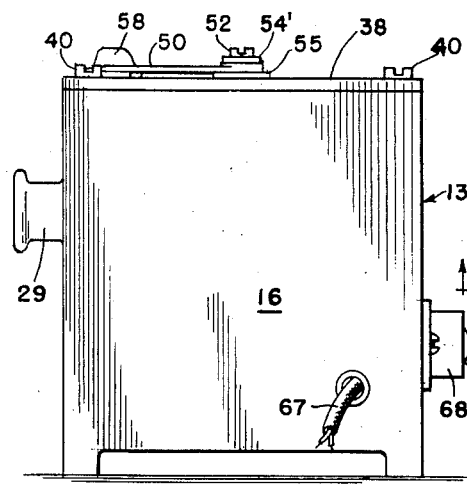
Fig. 3 is a side elevational view of the air impeller unit.

The complete assembly shown in Fig. 1 comprises three principal sections, namely, an air impeller unit designated generally by the numeral 11, a heater unit 12, and an air compartment 13 connected by flexible tubes 14 and 15.

The air impeller unit 11 (Figs. 3 to 7 and Figs. 12 to 14 inclusive) comprises a housing 16, the interior of the side walls of which are formed with an upper ledge 17 and a lower ledge 18 and extend to a bead formation 19 at each inside corner of the housing. The purpose of this bead will become apparent as the description proceeds. The bottom 20 of the housing 16 is formed with a boss 21 which forms a support or base upon which a motor 22 is mounted. Air inlets 23 are formed in the bottom 20 of the housing and provide a means for cooling the motor.

Figure 5:
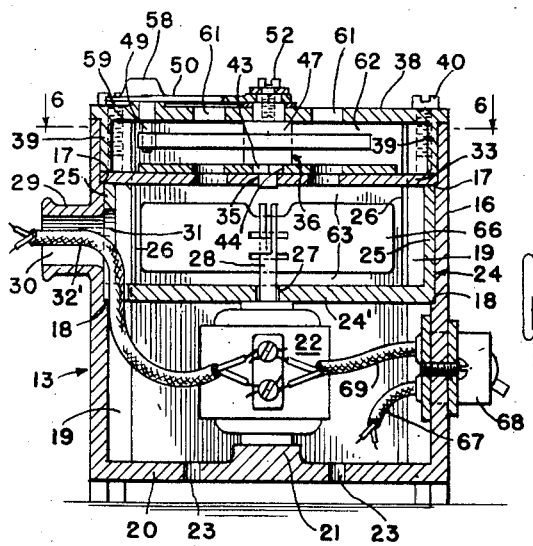
Fig. 5 is an elevational section taken along the broken line 5—5 of Fig. 4.
Figure 6:
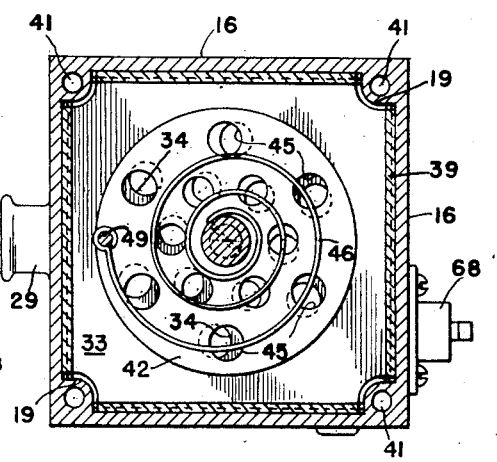
Fig. 6 is a sectional plan view taken along line 6—6 of Fig. 5.
Figure 7:
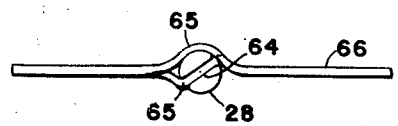
Fig. 7 is an enlarged detail showing the method of attaching the propeller or fan to the shaft of a motor in the air impeller unit.
Figure 12:
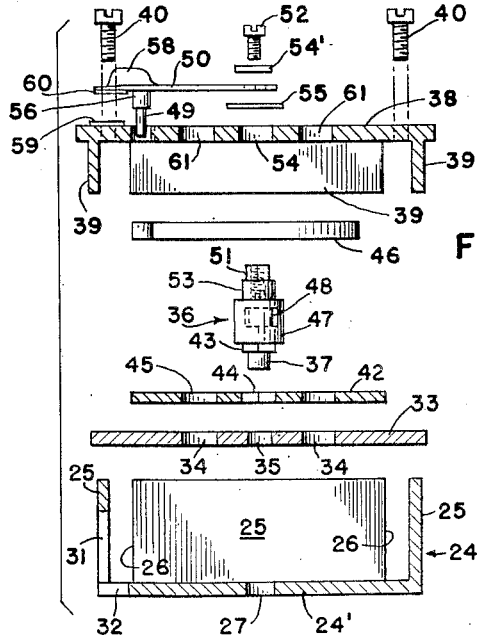
Fig. 12 is an exploded or drawn apart assembly of the parts comprising the air impeller unit with the housing and motor omitted.
Figure 13:
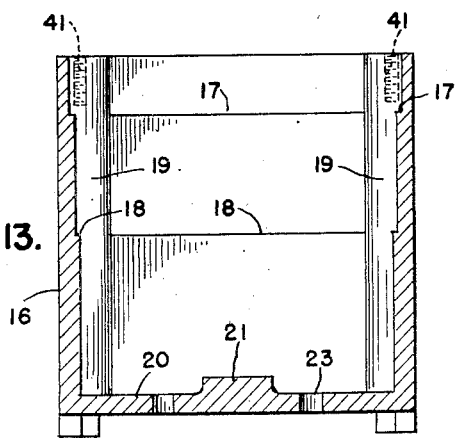
Fig. 13 is a sectional view of the air impeller housing.
Figure 14:
Fig. 14 is a fragmentary top view of the open housing.

A tray 24 having a base 24' and side walls 25 sets within the housing and rests upon the ledges 18 (Figs. 5 and 12). The said side walls 25 are cut short at their ends 26 to abut the said beads 19. The said tray has a central orifice 27, formed in its base 24', through which a shaft 28, of the motor 22, extends. A nipple 29 is formed upon one side wall of the housing and provides an air outlet 30. An opening 31 is formed in one side wall of the tray in alignment with the outlet 30. Directly under the said opening 31 in the base 24' is a smaller opening 32 providing passage for an electrical conductor cable 32'. A divider plate 33 rests upon the upper edges of the side walls 25 of the tray 24 and upon the upper ledges 17 formed upon the housing 16, and is cut out at its corners to fit around the bead as clearly shown in Fig. 6. The said divider plate 33 is formed with spaced air inlets 34 and with a central orifice 35 in which lower end 37, of a pin 36 having variously formed shanks (Fig. 12) engages. The said divider plate 33 is held in place by a corner plate 38 which has depending side walls 39, the lower edges of which engage the said divider plate 33. Screws 40, engageable in threaded bores 41 formed in the upper ends of the beads 19 (Fig. 6), are employed to hold the corner plate upon the housing 16. When the corner plate 38 is secured to the housing 16, it will be noted that the divider plate 33 and the tray 24 are held in place (Fig. 5). The threaded bores 41 extend into the beads 19 a distance sufficient to take the screws 40. The beads 19, however, extend the full distance of the depth of the housing for the purpose of simplifying the casting of the part.

Figure 4:
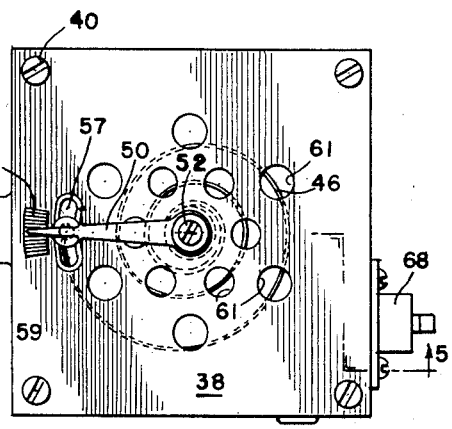
Fig. 4 is a top or plan view of same.

The pin or shaft 36 is removably mounted and held in place upon the divider plate 33, as hereinbefore stated, and rotates upon said divider plate. A disc 42 is slidably engageable upon the divider plate 33 and is adapted to a turning movement by its engagement with a lower squared shank 43 formed upon the pin 36 and its corresponding squared orifice 44. The said disc 42 is formed with air inlets 45 which coincide, when aligned therewith, with the corresponding air inlets 34 upon the divider plate 33. A thermostatic spiral spring 46 (Figs. 6 and 12) is secured at its inner end to the broadened circular shank portion 47 of the pin 36. A slot 48 is formed thereon for that purpose. The outer end of the spiral spring 46 is looped upon a pin 49 which depends from a pointer arm 50. The said pointer arm 50 engages, at its inner end, over an upper squared shank 51 upon the pin 36 and is held thereon by a screw 52. An upper circular shank 53 upon the pin 36 engages within a circular orifice 54 on the cover plate 38 and with the orifice 35 in the divider plate 33 to form bearings for the pin 36 and hold same steady. Spacer washers 54' and 55 are disposed between the head of the screw 52 and the inner end of the pointer arm 50 and between the inner end of the said pointer arm respectively. The depending pin 49 is broadened at its attachment end 56 with the pointer arm 50 and engages through an arcuate slot 57 in the corner plate 38 (Figs. 4 and 12). A finger hold 58 may be provided upon the pointer arm 50 to move the same in an arc and move the inner end of the thermo spring 46 clockwise or counterclockwise to regulate the rotary movement of the disc 42, thereby controlling the size of the air inlets 34 in the divider plate 33 coacting with the air inlets 45 in the rotatable disc 42. Serrations 59 upon the cover plate 38 are adapted to engage with a ridge 60 upon the pointer arm 50 and hold the said pointer arm in a fixed position. Air inlets 61 are provided to allow air to enter the chamber 62 formed between the cover plate 38, the divider plate 33 and their surrounding walls The motor shaft 28 extends upwardly into a compartment 63 formed between the divider plate 33, the tray bottom 24' and the side walls 25. The said motor shaft 28 is formed with a slot 64 in which a band 65, cut in a blade 66, is adapted to engage and hold the blade upon the shaft. The said blade 66 is adapted to rotate with the rotating shaft of the motor to drive air out of the compartment 63 through the outlet 30. A conductor cable 67 (Fig. 5) supplies electric current from a source (not shown) and leads to a switch box 68. From the said switch box a conductor 69 leads current to the motor 22 and continues through the conductor 32' which passes out through the outlet 30 and continues through the aforesaid tube 14 to the aforesaid heater unit 12 which will now be described.

Figure 8:
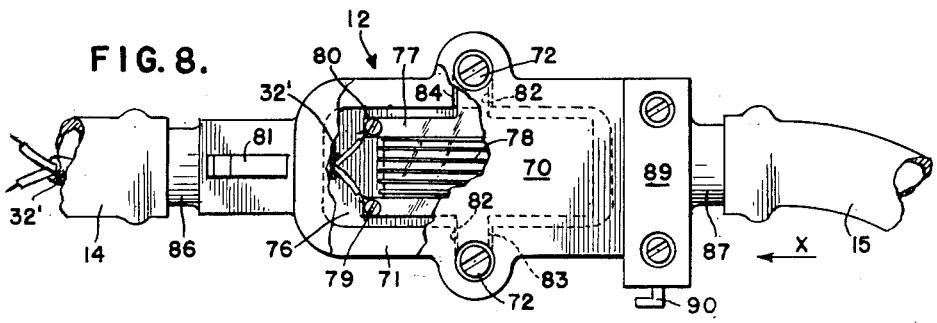
Fig. 8 is a plan view, partly broken away, of a heater element and is shown in larger scale.
Figure 9:
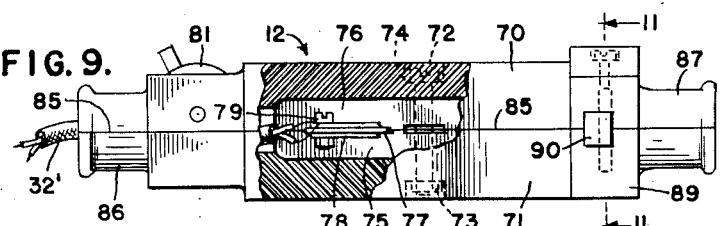
Fig. 9 is a side view of same, partly broken away.

The heater unit 12 comprises a housing of insulating, heat resisting material, formed with an upper and lower section 70 and 71 respectively, which are held together by means of bolts 72 and nuts 73 (Figs. 8 and 9). Each of said sections is formed with a depression 75 and 76 providing a compartment when the two sections are joined. The said compartment houses a heater unit consisting of a heavy mica plate 77 around which there is wound a highly resistant wire element 78. The conductor 32' which runs through tube 14 is connected to the terminal ends 79 and 80 of the wire element 78 and supplies electrical current to same when the switch 68 upon the impeller unit 11 and a switch 81 upon the heater unit 12 are closed. The mica plate 77 is formed with laterally projecting lugs or ears 82 which rest in laterally extending depressions 83 and 84 and are held, locked between the upper and lower sections 70 and 71 by the bolts 72 and their nuts 73. The said upper and lower sections 70 and 71, when joined, form a right connection along the line 85 and each section is formed with a split tubular projection providing a nipple 86 which acts as a coupler to receive the end of the tube 14. The opposite ends of the said upper and lower sections are also formed with split tubular projections which provide a nipple 87 to receive the end of the tube 15.

Figure 10:
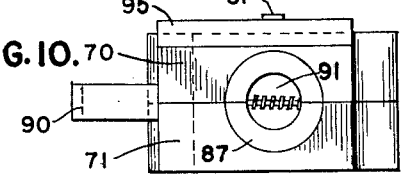
Fig. 10 is an end view of same looking in the direction indicated by the arrow X in Fig. 8.
Figure 11:
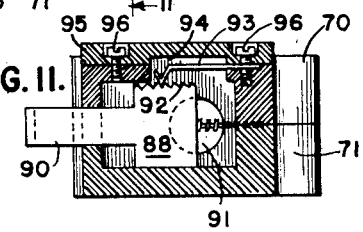
Fig. 11 is a transverse sectional view taken along line 11—11 of Fig. 9.

The said nipple 87 and tube 15 comprise the outlet for the impelled air as it leaves the chamber 76 and to regulate the air flow at this point there is provided a slide valve 88 which is slidably mounted in an extension 89 formed upon one end of the sections 70 and 71. The slide valve 88 is provided with an outwardly extending handle 90 and is employed to manually move the slide to fully or partially close or open an outlet 91. Fig. 8 shows the handle moved inwardly to close the outlet 91; Fig. 10 shows the handle fully extended and the outlet fully open; and in Fig. 11 the slide valve 88 shows the outlet 91 partially open. The upper edge of the slide 88 is serrated as at 92 and engages the V end of a leaf spring 93 which is held in a recess 94 and locked in place by a cap 95 which is in turn secured by means of screws 96.

The tube 15, connecting the heater unit 12 with the air chamber unit or cover 13, is provided with a bayonet coupler 97 and directs the impelled air into the inlet end 98 of a tortuous passage 99 which zig-zags between confining wall 100 of flexible plastic or other suitable material to an outlet element 101. The said cover or air compartment unit 13 may be made up in any suitable form adaptable to lead air evenly throughout its interior. The form shown in Fig. 1 is but one method of so doing.

In the modified form shown in Figs. 8a and 9a, the upper section 70' is formed with a depression 111 in which a disk 112 is adapted to rotatable movement and engages the squared shank 113 of a pivoting pin 114. The upper extending end of the said pin carries a knob 115 which is keyed to the pin by means of a set screw 116. Around the disk 112 there are orifices 117 which may be aligned with corresponding orifices 118 formed in the upper wall of the said upper section 70'. By turning the said disk 112 the orifices 118 may be reduced, closed or regulated as to size within the limit of the size of the orifices 118 in the top section 70'. The entrance of ambient air may thus be controlled.

Figure 15:
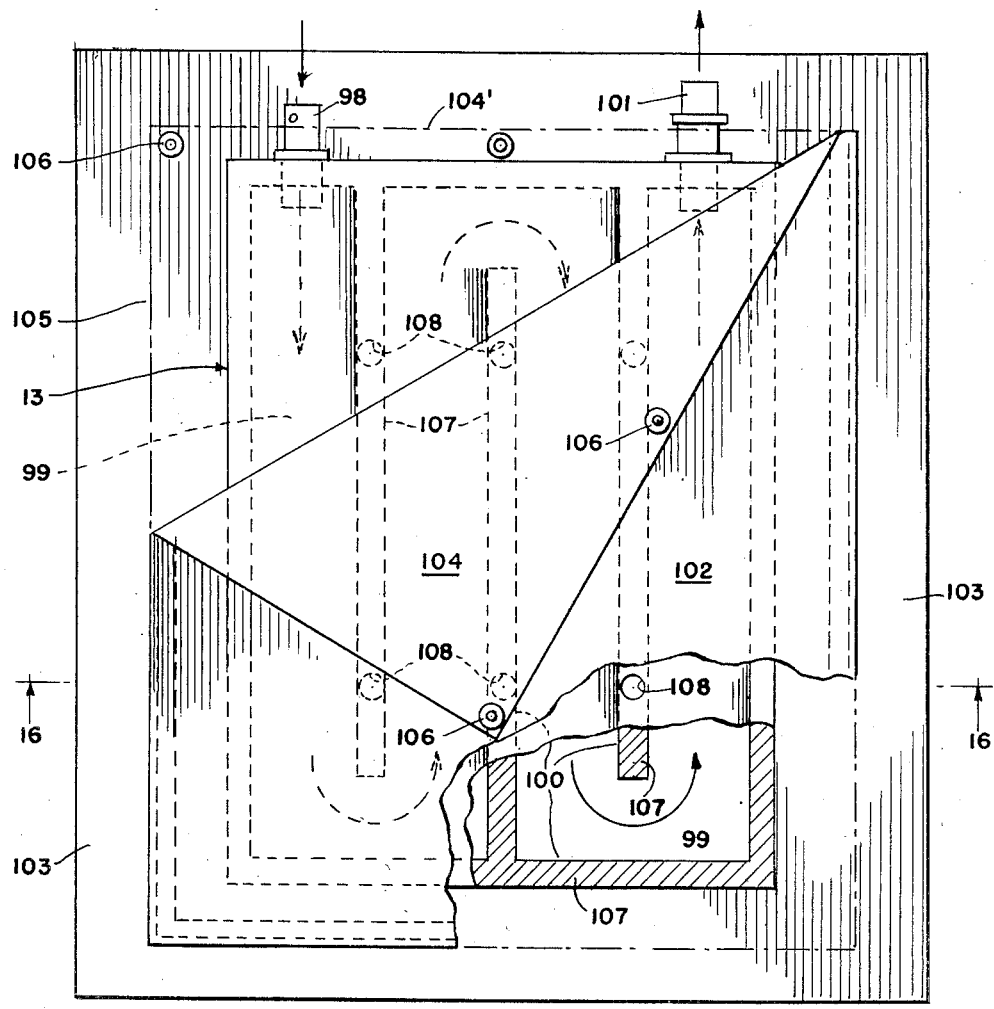
Fig. 15 is a plan view, partly broken away, of a pocket formed upon a blanket in which an air receptacle or cover is placed.
Figure 16:
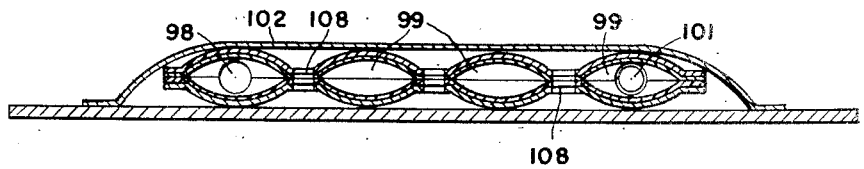
Fig. 16 is a cross section of same taken along line 16—16 of Fig. 15.

A more detailed construction and application of the cover or air receptacle 13 is shown in Figs. 15 and 16. In the said views of the drawings, the cover or air receptacle 13 is shown as contained in a pocket 102 which may be sewn to a blanket 103 having a flap formation 104 with which the pocket 102 may be opened along the top 104 and part way along the side 105. Snap hooks 106 may be provided to hold the flap 104 in closed position as indicated by dot-dash line 104' in Fig. 15. The tortuous channels 99 are formed by heat sealed dividing sections 107 and are provided with orifices 108 which extend through the heat sealed plastic sections 107.

In Fig. 1a there is shown a modified form of heat channels arranged between suitable flexible material to form an enclosing casing 121. The said flexible material may be of a porous nature or slightly so. A channel 122 extends around the outer sealing seam 123 of the said enclosing casing. Cross channels 124 extend from the opposite outer channels 122 and are formed by the walls 125 which in the case of fabrics may be sewn or in the case of plastics may be heat sealed. An inlet 126 may be provided with a nipple (not shown) to receive the end of the connecting tube 15. An outlet 127, considerably reduced in size, as compared with the inlet 126, is also provided and may be provided with a reducing air valve (not shown) to regulate the discharge of air as it leaves the air receptacle 13'.

While the drawings show comparatively large air channels it is obvious that by reducing the cross area of the channels the air receptacle 13 will be less bulky and more flexible than with the larger air channels.

The heater unit 13 may be built into the impeller unit housing in lieu of as shown in the drawings connected to the impeller unit by a tube.

In lieu of the electrical heating element described in the heating unit, an electric bulb may be employed, in which case suitable provision may be made to house the bulb.

In use the air impeller unit 11 is placed upon a stand, table or in any suitable position, the air receptacle 13 may be placed upon a bed, between sheets or covers and the heater unit 12 disposed in any suitable position between the tubes 14 and 15. The switch 68 upon the air impeller unit may be turned to the "on" position to start the motor 22. The air propeller 66 will rotate and create an air flow through the tube 14 to the heater unit 12, through the heater unit into the tube 15 to the air receptacle 13 entering same through the air inlet 98, then pass through the channels 99 and out through the air outlet 101. With the switch 81 in the "on" position the propelled air will be heated. With the switch 81 on the heater unit 12 in the "off" position unheated air will enter the air receptacle 13.

I claim:

1. A portable air impeller and air heating apparatus comprising an air impeller unit, a heating unit and an air receiving compartment, tubular connections between the said air impeller, heating unit and air receiving compartment, the said air impeller comprising a housing, a removable cover plate having air inlets attached to the housing, a dividing plate within the said housing forming an air chamber between it and the said cover plate, a tray within the said housing forming, with the said divider plate, an air impeller chamber, an air propeller within said chamber, a motor within the said housing having a shaft extending through the tray bottom and into the said air impeller chamber carrying and rotating the said air propeller, and an air receptacle having an air inlet and outlet thereon and adapted to receive impelled air from the impeller through the said tubular connections.

2. The portable air impeller and heating apparatus as defined in claim 1 wherein the said air receptacle is formed with a tortuous channel through which the impelled air passes.

3. The portable air impeller and heating apparatus as defined in claim 2 where a switch is provided to control the source of electrical current to the motor of the said air impeller.

4. The portable air impeller and heating apparatus as defined in claim 2 wherein a second switch is provided upon the heater unit to control the electrical current flow to same.

5. The portable air impeller and heating apparatus as defined in claim 4 wherein the electrical current supply to the heater unit is carried through a conductor in the said tubular connection between the impeller unit and the heater unit.

6. The portable air impeller and heating apparatus as defined in claim 4 wherein the said air receptacle unit is formed with enclosing walls outlining a tortuous air channel therethrough and having an air inlet at one end of the tortuous channel and an air outlet at the opposite end of same.

7. A portable air impeller and heating apparatus comprising an air impeller unit, a heating unit and a plastic air cover unit forming a more or less air tight receptacle, said air receptacle having an enlarged inlet and reduced or closed outlet to provide a continuous constant flow of warm or cool air through same, air channels formed in said air receptacle and separated by forming heat sealed dividing walls at determined intervals to prevent an uneven and undue inflation at the center of the air receptacles, a manual heat controlling means within easy reach at the inlet to the said air receptacle regardless of the calibrated intake, said means comprising a slide valve at the outlet of the heating unit allowing some of the ambient air to mix with the heated air in such proportion to cover such ranges desirable for human comfort.

GERHARDT BLAIR.

REFERENCES CITED

The following references are of record in the file of this patent:

UNITED STATES PATENTS

| Number | Name | Date |
|---|---|---|
| 1,351,986 | Barclay | Sept. 7, 1920 |
| 1,817,277 | Uhlig | Aug. 4, 1931 |
| 1,955,240 | Kenney | Apr. 17, 1934 |
| 2,259,712 | Sweetland | Oct. 21, 1941 |
| 2,493,067 | Goldsmith | Jan. 3, 1950 |
| 2,511,139 | Yeamans | June 13, 1950 |